United States Patent
Mori et al.

(10) Patent No.: US 11,382,284 B2
(45) Date of Patent: Jul. 12, 2022

(54) TREE WATERING APPARATUS

(71) Applicant: Armen Artinyan

(72) Inventors: Damon Mori, Canoga Park, CA (US); Kevin Miller, Canoga Park, CA (US); Hassan Hamza, Canoga Park, CA (US); Garrett Burkitt, Canoga Park, CA (US)

( * ) Notice: Subject to any disclaimer, the term of this patent is extended or adjusted under 35 U.S.C. 154(b) by 120 days.

(21) Appl. No.: 16/510,744

(22) Filed: Jul. 12, 2019

(65) Prior Publication Data

US 2021/0007297 A1  Jan. 14, 2021

(51) Int. Cl.
*A01G 25/02* (2006.01)

(52) U.S. Cl.
CPC ................. *A01G 25/023* (2013.01)

(58) Field of Classification Search
CPC ............................. A01G 25/02; A01G 25/023
See application file for complete search history.

(56) References Cited

U.S. PATENT DOCUMENTS

| | | | |
|---|---|---|---|
| 2,782,561 A * | 2/1957 | Smith ................ | A01G 13/0281 47/21.1 |
| 2,784,528 A * | 3/1957 | Rudenauer ............ | A01G 25/00 47/48.5 |
| 2,909,328 A * | 10/1959 | Babyak ................ | A01G 27/006 239/268 |
| 3,315,752 A * | 4/1967 | Pasquini ................ | A01G 9/28 172/19 |
| 4,010,898 A | 3/1977 | Williams | |
| 4,087,938 A * | 5/1978 | Koch ................... | A01G 25/00 47/48.5 |
| 5,117,582 A | 6/1992 | Cissel, Jr. | |
| 5,212,905 A * | 5/1993 | Philoctete ............ | A01G 25/00 47/21.1 |
| 5,285,968 A * | 2/1994 | McSheehy ............ | A01G 25/02 239/273 |
| 5,566,503 A * | 10/1996 | Nickson ................ | A01G 9/28 47/33 |
| 5,685,488 A * | 11/1997 | Gwartney ............ | A01G 25/02 239/279 |
| 5,709,049 A * | 1/1998 | Baird ................ | A01G 13/0281 47/21.1 |
| D399,712 S * | 10/1998 | Villella ............................ | D8/1 |
| D413,495 S * | 9/1999 | Carter ............................. | D8/1 |
| 6,023,883 A | 2/2000 | Bacon, Jr. | |
| 6,367,194 B1 * | 4/2002 | Measday ................ | A01G 9/28 47/32.4 |

(Continued)

*Primary Examiner* — Monica L Barlow
*Assistant Examiner* — Aaron M Rodziwicz
(74) *Attorney, Agent, or Firm* — Louis F. Teran (57) ABSTRACT

The present invention relates to a tree watering apparatus that can be used to irrigate the base of a tree and to protect the roots thereof. The present invention comprises a semi-circular ring having a bottom half that serves as a root barrier and a top half that serves as a barrier to retain water around a tree while the water percolates to the root system of the tree. A distribution tubing is attached to a water supply and directs water around a tree which is then retained on the ground around the tree by the top half of the present invention while it percolates into the ground. Water that percolates into the ground is then directed to the root system of the tree by the bottom half of the present invention that is buried.

8 Claims, 11 Drawing Sheets

(56) References Cited

U.S. PATENT DOCUMENTS

| | | | | |
|---|---|---|---|---|
| 6,418,663 | B1 * | 7/2002 | Smith | A01G 27/006 |
| | | | | 47/48.5 |
| 6,601,339 | B1 | 8/2003 | Parker | |
| 6,606,818 | B1 * | 8/2003 | Christmas | A01M 1/20 |
| | | | | 43/132.1 |
| 7,080,484 | B2 * | 7/2006 | Littge | A01G 27/005 |
| | | | | 47/79 |
| 7,540,110 | B2 * | 6/2009 | Al-Sulaiman | A01M 1/20 |
| | | | | 239/273 |
| 8,443,893 | B1 * | 5/2013 | Finger | E21B 37/00 |
| | | | | 166/312 |
| 8,533,991 | B2 * | 9/2013 | Lais | A01G 13/0243 |
| | | | | 47/32.4 |
| 8,826,588 | B1 * | 9/2014 | MacKichan | A01G 9/124 |
| | | | | 47/30 |
| 9,138,757 | B2 * | 9/2015 | McLarty | A01G 25/02 |
| 9,456,560 | B1 * | 10/2016 | MacKichan | A01G 25/00 |
| 9,999,894 | B2 * | 6/2018 | Becktell | B05B 1/3026 |
| D825,290 | S * | 8/2018 | Lortscher | D8/1 |
| D862,641 | S * | 10/2019 | Smith, Sr. | D23/214 |
| 10,426,101 | B2 * | 10/2019 | Galdi | A01G 9/0291 |
| 10,813,299 | B2 * | 10/2020 | Stover | A01G 13/0281 |
| 11,058,073 | B2 * | 7/2021 | Lortscher | A01G 13/0268 |
| 2013/0056561 | A1 * | 3/2013 | Freels | A01G 25/02 |
| | | | | 239/542 |
| 2013/0126643 | A1 * | 5/2013 | McLarty | B05B 1/14 |
| | | | | 239/553 |
| 2014/0014735 | A1 * | 1/2014 | Ford | B05B 15/652 |
| | | | | 239/74 |
| 2017/0205002 | A1 * | 7/2017 | Babu | F16L 11/04 |
| 2017/0339835 | A1 * | 11/2017 | Measday | A01G 9/28 |
| 2019/0150377 | A1 * | 5/2019 | Zhang | A01G 7/06 |
| 2019/0230874 | A1 * | 8/2019 | Cohen | A01G 13/0281 |
| 2021/0112737 | A1 * | 4/2021 | Saeed | A01G 25/06 |

* cited by examiner

TREE WATERING APPARATUS

BACKGROUND OF THE INVENTION

Field of the Invention

The present invention relates generally to the field of tree watering devices. More specifically, the present invention relates to a tree watering apparatus that can be used to irrigate the base of a tree and to protect the roots thereof and direct their growth downward.

Description of Prior Art

Sprinklers are a common tool to irrigate lawns and other vegetation. In light of drought conditions throughout some parts of the world, overwatering may be environmentally harmful and costly. Even more, overwatering may lead to fungus or insect infestations. Conversely, underwatering may lead to damage or dry vegetation and trees. This especially poses a problem for trees or shrubs which may require varying watering needs compared to nearby vegetation. Supplying the proper amount of water to trees can be challenging, given the varying sizes and shapes of trees and the close proximity to other plants or trees requiring less water. Some are wide, requiring the sprinkler to be repositioned multiple times to evenly water the surrounding ground. Some are in a slope that allows the water to flow away from the tree.

Sprinklers, especially rotary and oscillating sprinklers, are generally designed to shoot volumes of water in both an upward and outward pattern in order to cover large areas. Often, this method of watering sprays water on the fruit and leaves of trees and shrubs increasing risk of fungal diseases. Another common way of watering trees is dropping a garden hose near the base of the tree and turning the faucet to a very low water volume. However, often the water is concentrated on one side of the tree while the opposite side may lack the ideal amount of water. A soaker hose is another popular method to water a tree. However, a soaker hose have be difficult and time consuming to unwrap and place around a tree. Removal of the soaker hose may be necessary every time the grass around the tree will be mowed because the soaker hose can get caught in the mower blades. The grass and other vegetation around the tree can also be damaged if the soaker hose is left for an extended period of time as it can leave an imprint on the grass, sand, or vegetation. Yet another method of watering trees is a low volume drip/sprinkler system. These typically involve long, thin, plastic tubing lying within the landscape that can be crushed or severed if ran over by a mower.

There are a number of systems designed to water trees in the prior art. Previous attempts have proven ineffective and unsuccessful. U.S. Pat. No. 6,601,339 teaches a system with a base which has a periphery and a central hole with a slot in between and interior and exterior walls that extend upwardly from the base. U.S. Pat. No. 5,117,582 teaches a tree irrigator utilizing a flexible tree encircling container which may receive a substantial volume of a tree irrigating liquid and which will slowly disperse the liquid to the tree over a period of time. U.S. Pat. No. 6,023,883, teaches a drip irrigator which is fitted around the trunk of a tree and holds a supply of water which slowly percolates into the soil to maintain irrigation of the tree roots, particularly during hot and dry weather. A tree surrounding ring for protecting the trunk of a tree and enhancing the appearance of the tree is taught in U.S. Pat. No. 2,782,561. The ring is interrupted by a ring slot or formed from two semicircular sections to facilitate fitting the ring around the trunk of the tree. U.S. Pat. No. 4,010,898 teaches an apparatus that includes a semi-permanent, semi-looped elastic distributing conduit having a closed end and an open end, with a plurality of spray nozzles. U.S. Pat. No. 5,285,968 teaches a water chamber in the form of an annulus having a large open segment which permits the chamber to serve as a yoke which can be positioned on the ground surrounding the trunk of small trees at the base of the trunk. The chamber is continuously fed with water from a garden hose and the wall of the chamber is pierced with a single row of water orifices which are distributed along a line around the upper, outer diameter of the annular body. This arrangement permits the watering of a tree outward, around the drip-line beneath the tree's outer foliage.

Therefore, there exists a need for a tree irrigator which will overcome the deficiencies of the prior art devices without having its own drawbacks. The tree watering apparatus of the present invention provides a highly practical and satisfactory device which is a significant advance in the art.

BRIEF SUMMARY OF THE INVENTION

Accordingly, the present invention has been made in view of the above-mentioned disadvantages occurring in the prior art, and it is the object of the present invention to provide a tree watering apparatus that properly irrigates a tree without overwatering or underwatering it.

It is another object of the present invention to provide a tree watering apparatus with some rigidity for durability and that is not damaged easily by blades from a mower, tree cutter, or other gardening tools.

It is yet another object of the present invention to provide a tree watering apparatus that incorporates a root barrier that protects the roots of the tree and directs them in a downward direction away from the surface of the ground.

It is yet another object of the present invention to provide a tree watering apparatus that maintains the irrigation water around the tree until it is absorbed by the ground around the base of the tree rather than allowing the irrigation water to flow away from the tree.

It is yet another object of the present invention to provide a tree watering apparatus to which other accessories can be incorporated, such as a landscape light.

It is yet another object of the present invention to provide a tree watering apparatus that is cost effective and manufacturable.

To accomplish the above objects, the present invention is embodied in a tree watering apparatus comprising a semi-circular ring, a distribution tubing, a plug, and a connector. The distributing tubing has the connector attached at one and the plug at the other end. Water supply is attached to the connector to allow water to flow into the distribution tubing and out a plurality of holes. The semi-circular ring partly buried into the ground around the base of the tree and the distribution tubing is placed on top of the semi-circular ring above the ground so that it can irrigate the base of the tree. Furthermore, the bottom section of the semi-circular ring is buried into the ground far enough to protect the roots of the tree and direct their growth downward and away from the ground surface.

The above and other features and advantages of the present invention, as well as the structure and usage of various embodiments of the present invention, are described in detail below with reference to the accompanying drawings.

DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functional similar elements. A more complete appreciation of the invention and many of the attendant advantages thereof will be readily obtained as the same becomes better understood by reference to the following detailed description considered in connection with the accompanying drawings, wherein.

DETAILED DESCRIPTION OF THE INVENTION

Certain terminology is used in the following descriptions for convenience only and is not limiting. The words "right", "left", "lower", and "upper" designate directions in the drawings to which reference is made. The words "inwardly" or "distally" and "outwardly" or "proximally" refer to directions toward and away from, respectively, the geometric center or orientation of the device and instruments and related parts thereof. The terminology includes the above-listed words, derivatives thereof, and words of similar import.

Although the present invention can be used in connection with any type of irrigation application, it is specially suited for irrigation applications in connection with trees. Accordingly, the present invention will be described herein with reference to tree irrigation applications. However, the preferred system of the present application may also be adapted for use on lawns, or flower applications.

Reference will be made to the drawings in which various elements of the present invention will be given numerical designations and in which the invention will be discussed so as to enable one skilled in the art to make and use the present invention.

The present invention comprises a tree watering apparatus 100 that is placed around the base of a tree and comprising a semi-circular ring 10, distribution tubing 30, a plug 40, and a connector 50. It is well-established that the preferred method of watering a tree is at the base spread over a large area around the base of the tree without irrigating the fruits or leaves growing from the branches of the tree. Such method of irrigation insures that the water is spread around the tree so as to encourage root growth in all directions. The tree watering apparatus 100 of the present invention is partly buried into the ground around the base of the tree. The distribution tubing 30 is placed in a tubing channel 17 and has a connector 50 that is connected to a water supply in one end and a plug 40 to prevent flow of water in the other end. A plurality of watering holes 35 are located in the distribution tubing 30 to facilitate the outward flow of water to irrigate the base of the tree.

Figure 1:
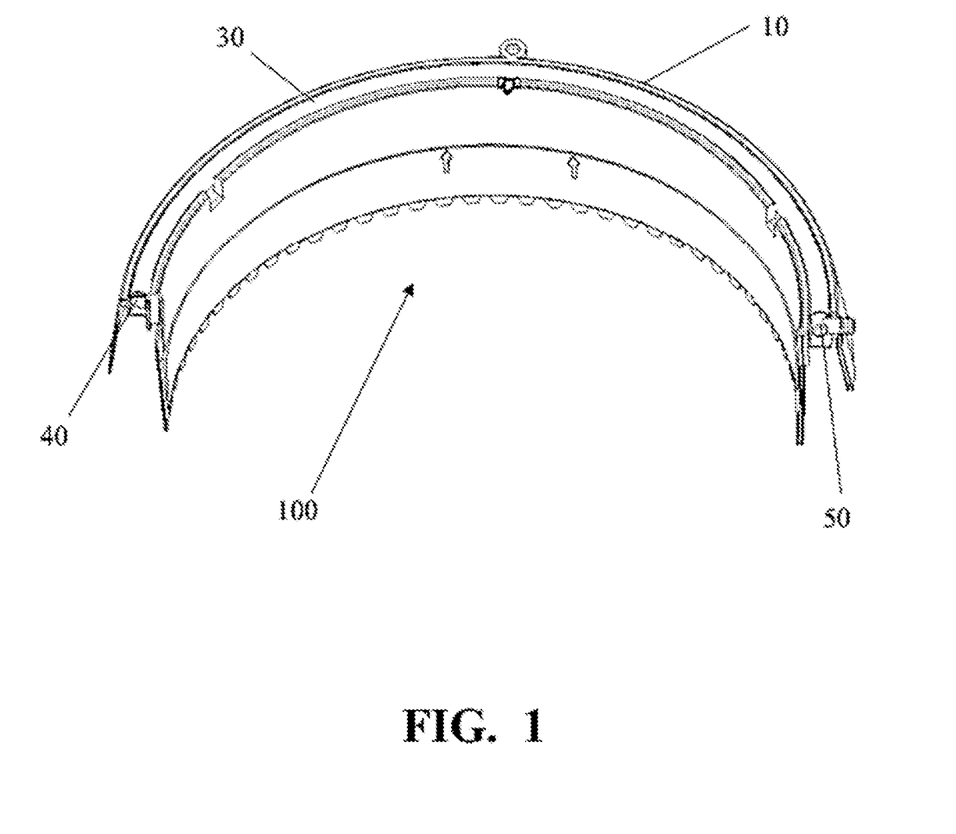
FIG. 1 shows a perspective view of the tree watering apparatus according to the present invention as it is used around a tree.
Figure 2:
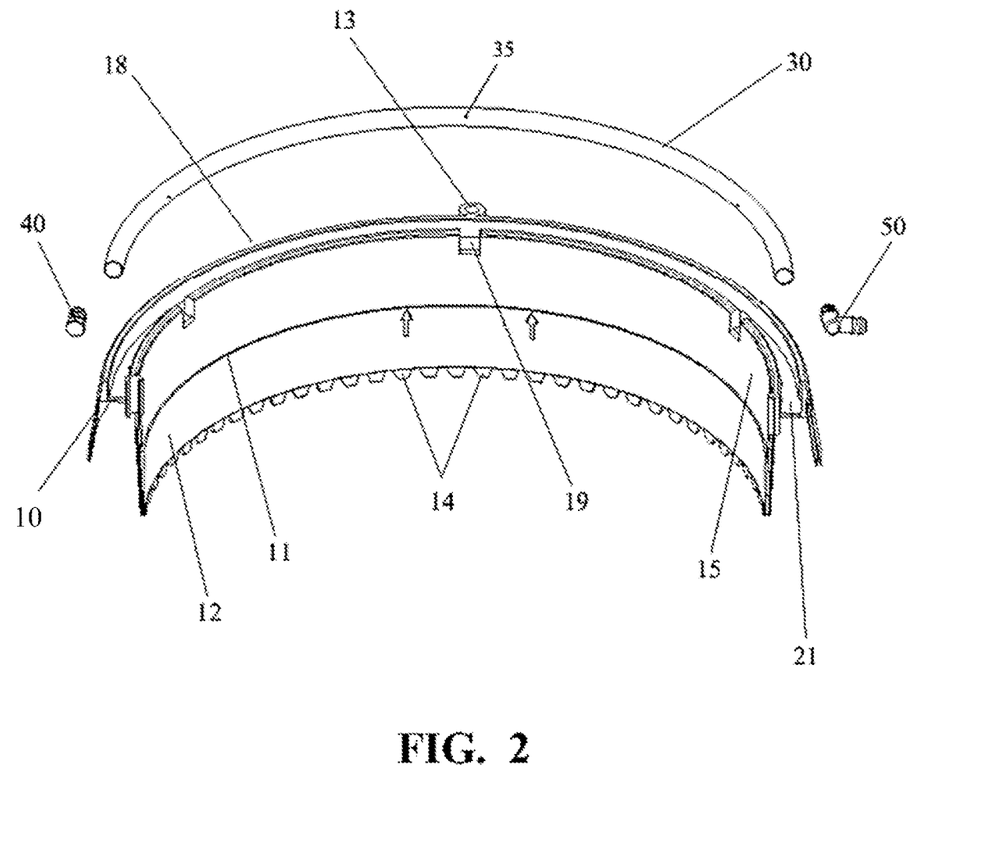
FIG. 2 shows an exploded view of the tree watering apparatus according to the present invention.

FIG. 1 shows a perspective view of the tree watering apparatus 100 of the present invention as it would be used around a tree. FIG. 2 shows an exploded view of the tree watering apparatus 100 of the present invention to depict in greater detail the various components that comprise the tree watering apparatus 100.

Figure 3:
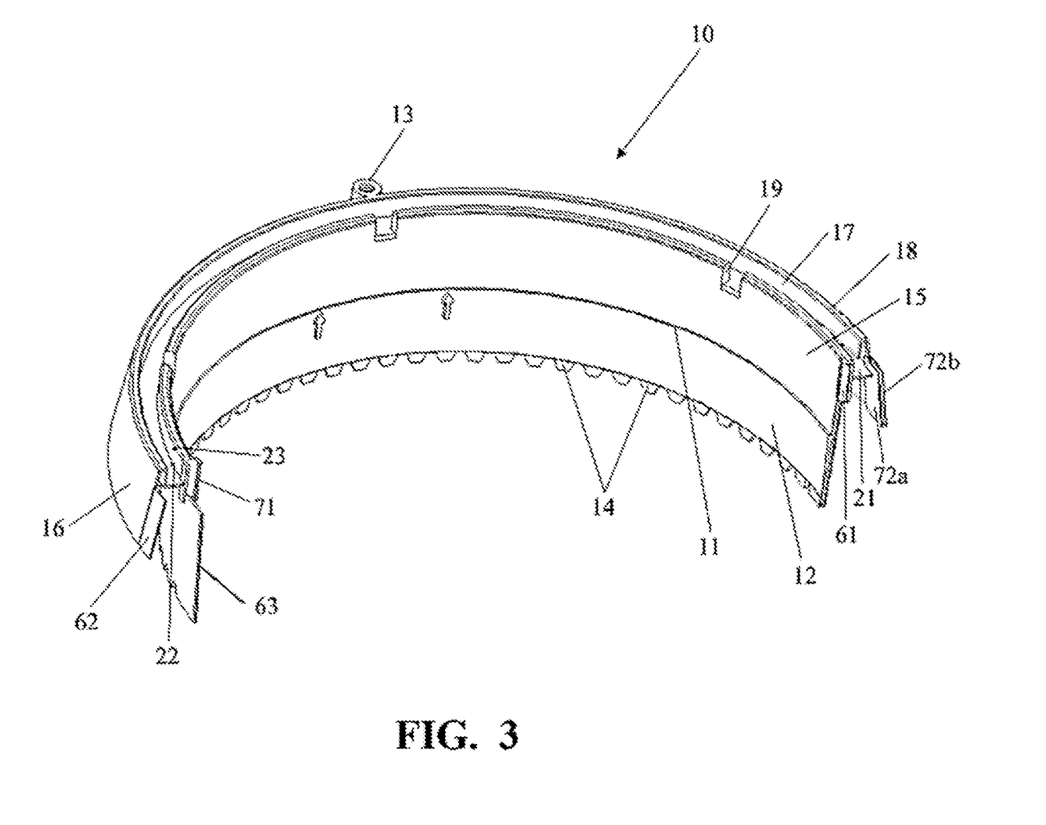
FIG. 3 shows a top perspective view of the semi-circular ring as used in the tree watering ring according to the present invention.
Figure 10:
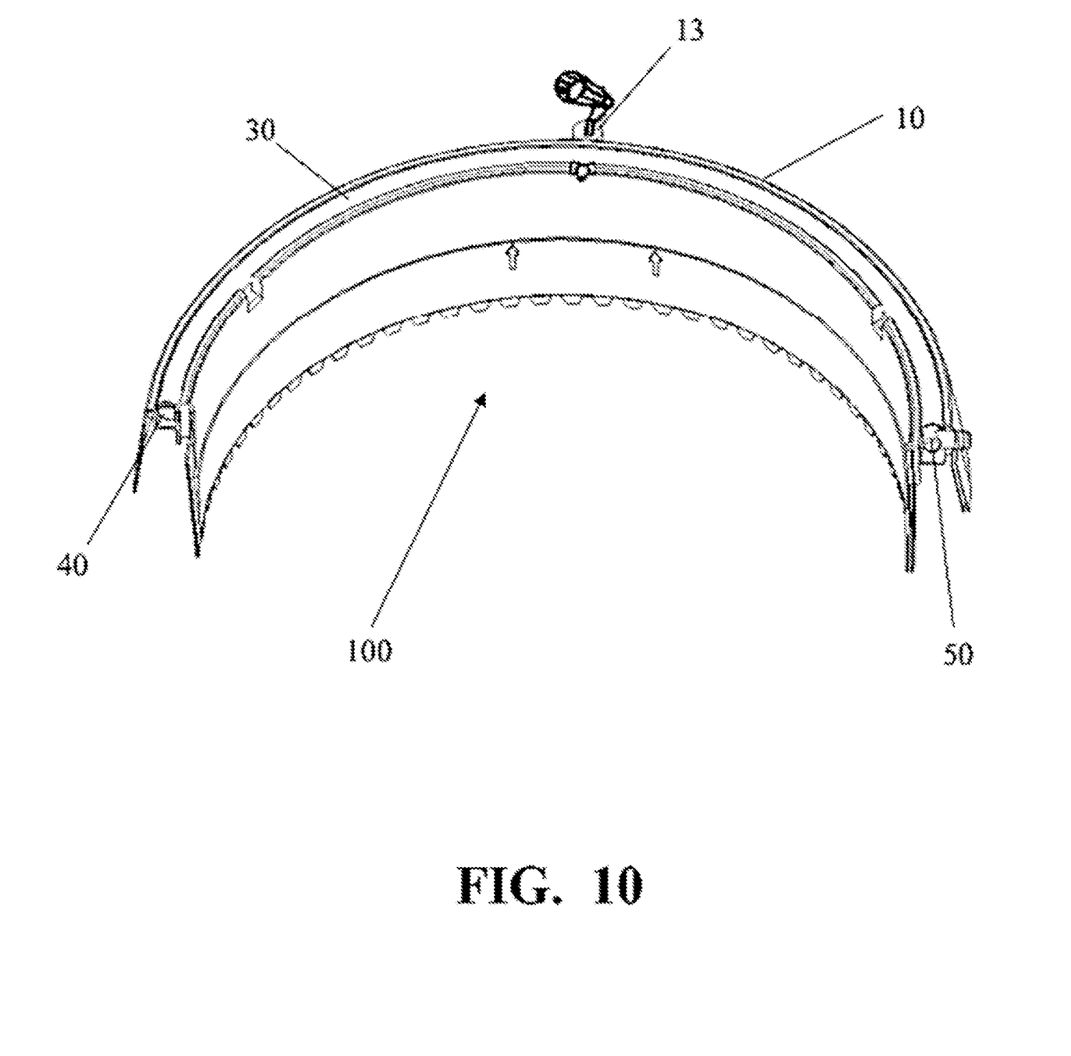
FIG. 10 shows a perspective view of the tree watering apparatus according to the present invention having an accessory item attached thereto.

As shown in FIG. 3, the semi-circular ring 10 has a top section and a bottom section with a grade level line indicator 11 in between the two. The bottom section comprises a bottom barrier 12 that extends downward from said grade level line indicator 11. In addition, a plurality of teeth-like structures 14 extend downwardly from said bottom barrier 12. The top section comprises an inner barrier 15 that extends upward from said grade level line indicator 11 and an outer barrier 16 both of which share the same center of curvature. Further, the tubing channel 17 is located in between the inner barrier 15 and the outer barrier 16 at a predetermined depth from the top edge 18 of the top section. Additionally, a plurality of slots 19 extend downward from the top edge 18 up to the base 21 of the tubing channel 17. Furthermore, a plurality of drain holes 22 are located on the base 21 of the tubing channel 17 and a plurality of tabs 23 are located along the inner wall of the tubing channel 17. Additionally, an accessory hole 13 is attached to the outer barrier 15 into which accessories can be inserted, such as a flag or a light, as shown in FIG. 10. Finally, a subterranean punch-out hole is on the base 21 of the tubing channel 17.

Figure 4:
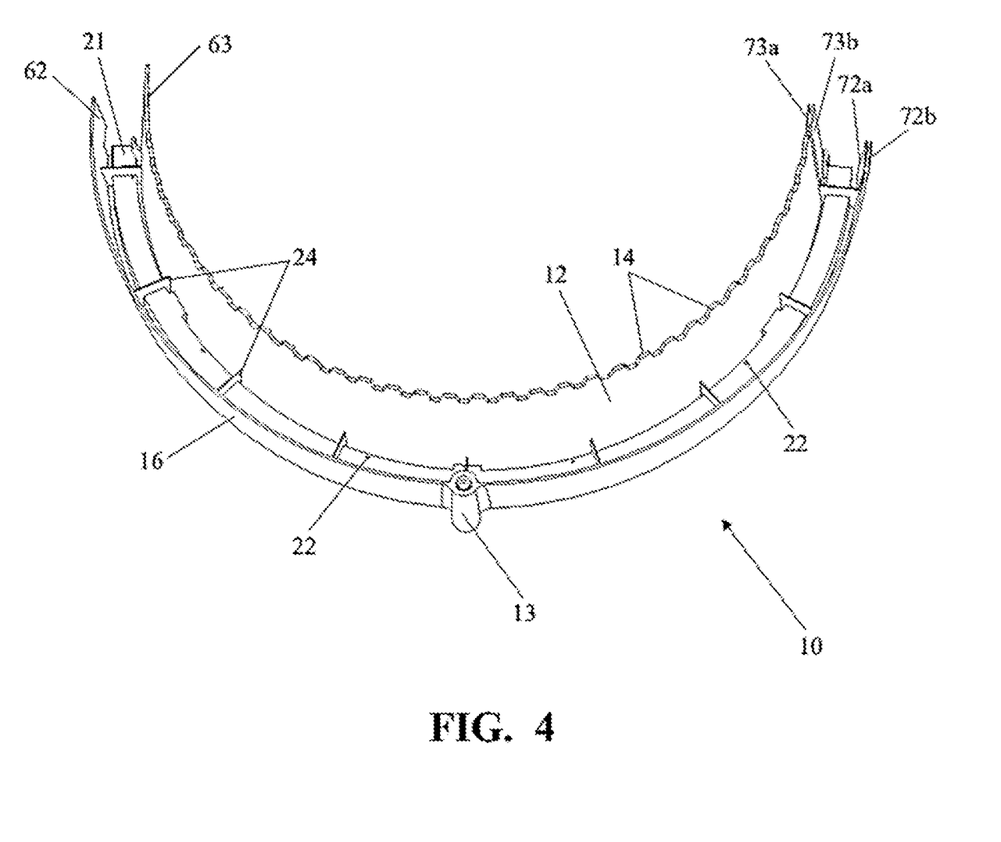
FIG. 4 shows a bottom perspective view of the semi-circular ring as used in the tree watering ring according to the present invention.
Figure 5:
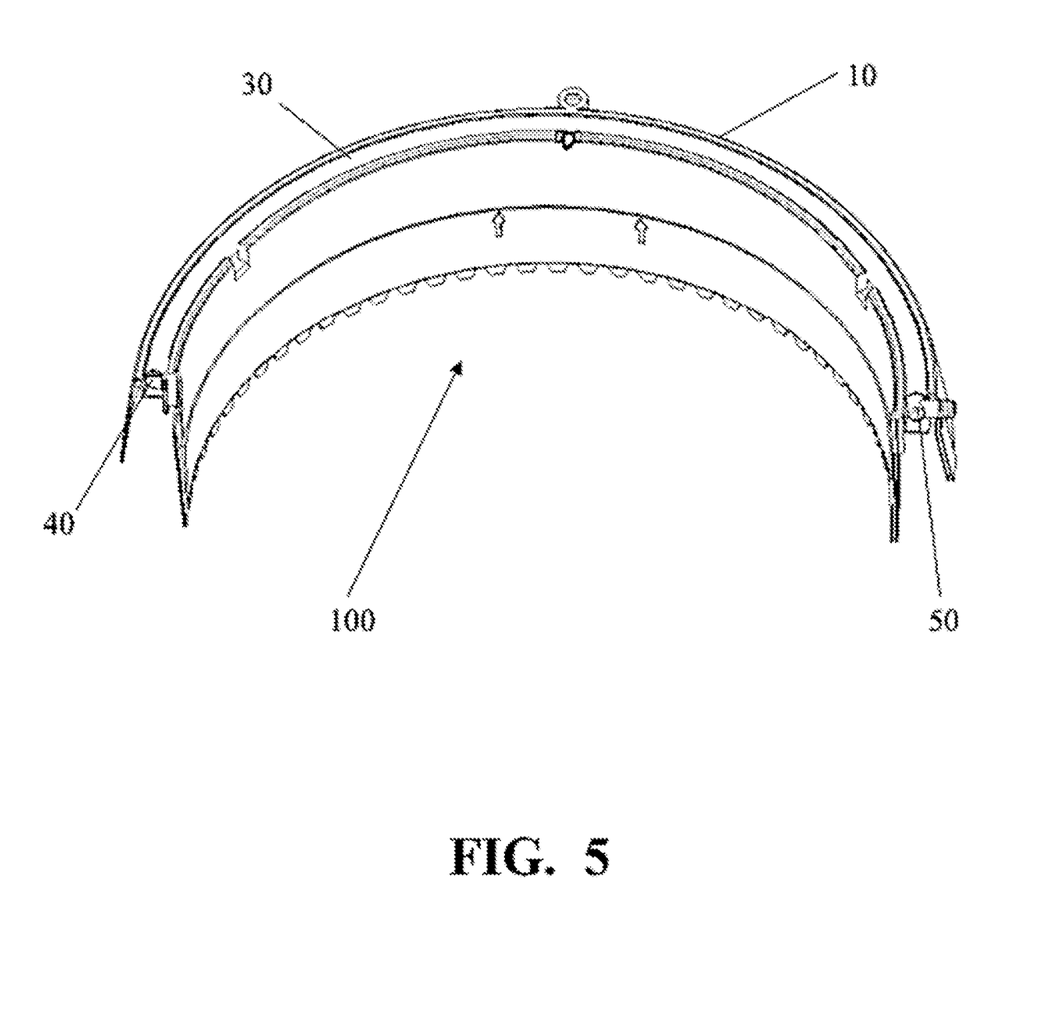
FIG. 5 shows a perspective view of the distribution tubing connected with the plug in one end and the connector in the other end as used in the tree watering ring according to the present invention.

As shown in FIG. 4, a plurality of supporting ribs 24 are located underneath the base 21 and in between the inner barrier 15 and the outer barrier 16. As shown in FIG. 5, the distribution tubing 30 is a long tube, preferably made of rubber or elastic material, and having a plug 40 attached at one end and a connector 50 at the other. Additionally, said distribution tubing 30 has a plurality of watering holes 35 that align with the plurality of slots 19 in the semi-circular ring 10.

Hereinafter, an explanation on the methods of assembling the product of the present invention, the installation thereof to a tree, and the operating states thereof will be given.

Figure 11:
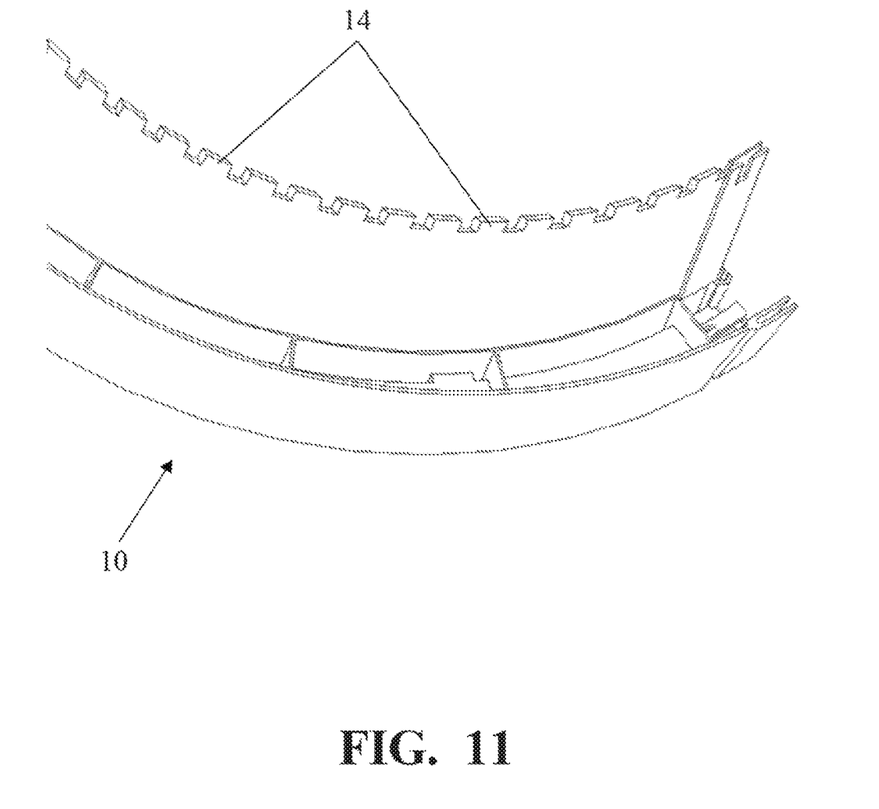
FIG. 11 shows a perspective close-up view of the teeth-like structures.

For the assembly of the tree watering ring 100 of the present invention, the semi-circular ring 10 is placed around a tree, preferably concentric to the tree, at a predetermined distance from the base of the trunk of the tree. Then the semi-circular ring 10 is pushed down until the bottom half 10b is buried in the ground and the grade level line indicator 13 is at ground or grade level. The teeth-like structures 14 aid in the process of digging and burying the bottom section of the semi-circular ring 10. It may be that the teeth-like structures 14 have angled edges so as to make the edges sharp to facilitate in the process of digging and burying the bottom section of the semi-circular ring 10, as shown in FIG. 11.

Once the semi-circular ring 10 is installed, the distribution tubing 30 is placed within the tubing channel 17 with the watering holes 35 aligned with the slots 19 in the semi-circular ring 10. Then the plug 40 is attached to one end of the distribution tubing 30 while the connector 50 is attached to the other. The connector 50 is then connected to a water supply line that supplies water into the distribution tubing 30. The flow of the water is stopped by the plug 40, thus, allowing water pressure to build up within the distribution tubing 30 until the water is ejected out through the watering holes 35. After being ejected out the watering holes 35, the water sprays through the slots 19 and on to the ground or the trunk of the tree. In certain cases, it may be preferred to install a pressure regulating emitter into the watering holes 35 so as to optimize the outflow of water. Then as some of the water percolates down through the ground, the bottom barrier 12 aids in directing the water towards the root system of the tree.

Sometimes, the water supply line is buried in the ground or subterranean and the end of it extends out of the ground. On these occasions, the semi-circular ring 10 can be installed directly over the water supply line such that the end of the water supply line aligns with the subterranean punch-out hole that is on the base 21 of the tubing channel 17. Then the subterranean hole is punched out and the water supply line is routed therethrough to attach to the connector 50 of the distribution tubing 30. In this configuration, the water supply line is buried in the ground and kept hidden from view underneath the semi-circular ring 10.

In some occasions, however, the water flow out from the watering holes 35 may be greater than the rate that the water percolates into the ground. Thus, water may build up on the ground temporarily. In such circumstance, the inner barrier 15 serves to retain the water around the tree until it percolates down into the root system.

Furthermore, the tabs 23 retain the distribution tubing 30 within the tubing channel 17 and the drain holes 22 drain water that flows into the tubing channel 17. Such water is drained on to the ground under the tubing channel 17 so that it may percolate down in to the root system.

Figure 7:
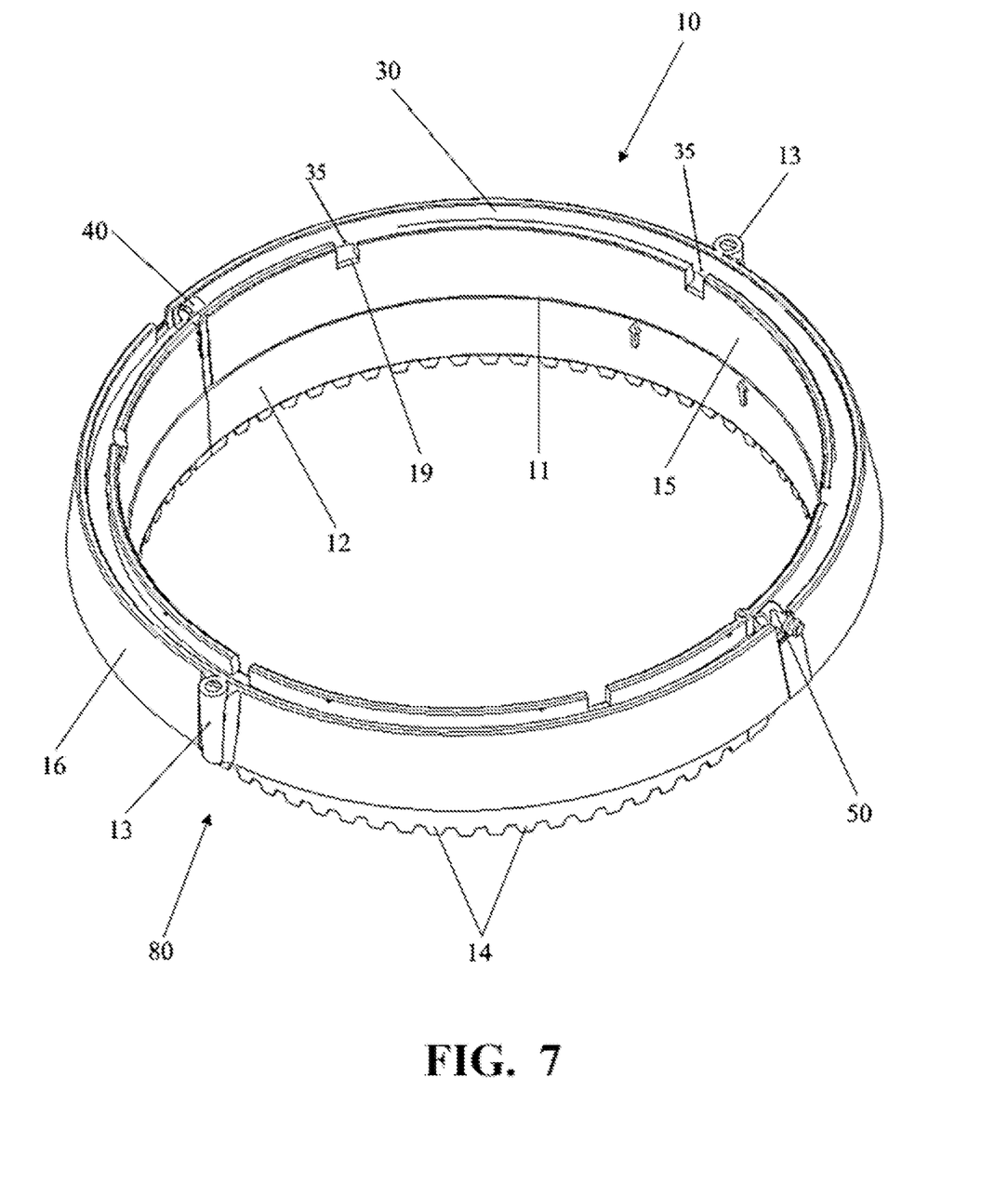
FIG. 7 shows a perspective view of two semi-circular rings connected together in a circular configuration.

In certain circumstances, substantial amount of water needs to be retained around the tree so that it can be directed to the root system as it percolates into the ground. When water is in a hill or incline, for example, failing to effectively retain the water around the tree will result in the water flowing down the hill before it can percolate into the root system. Similarly, when a tree is young or newly planted, for example, extra water is needed to reach the root system. Thus, water needs to be retained around the tree until it percolates into the ground. In such circumstances, the semi-circular ring 10 will likely serve its purpose. After all, the inner barrier 15 serves to entrap or retain the water on the ground within the semi-circular ring 10. In more extreme circumstances, however, a single semi-circular ring 10 may not suffice. Thus, the tree water apparatus 100 of the present invention allows one semi-circular ring 10 to be attached to another semi-circular ring 80 to create a full circle or ring around the tree, as shown in FIG. 7.

Figure 6:
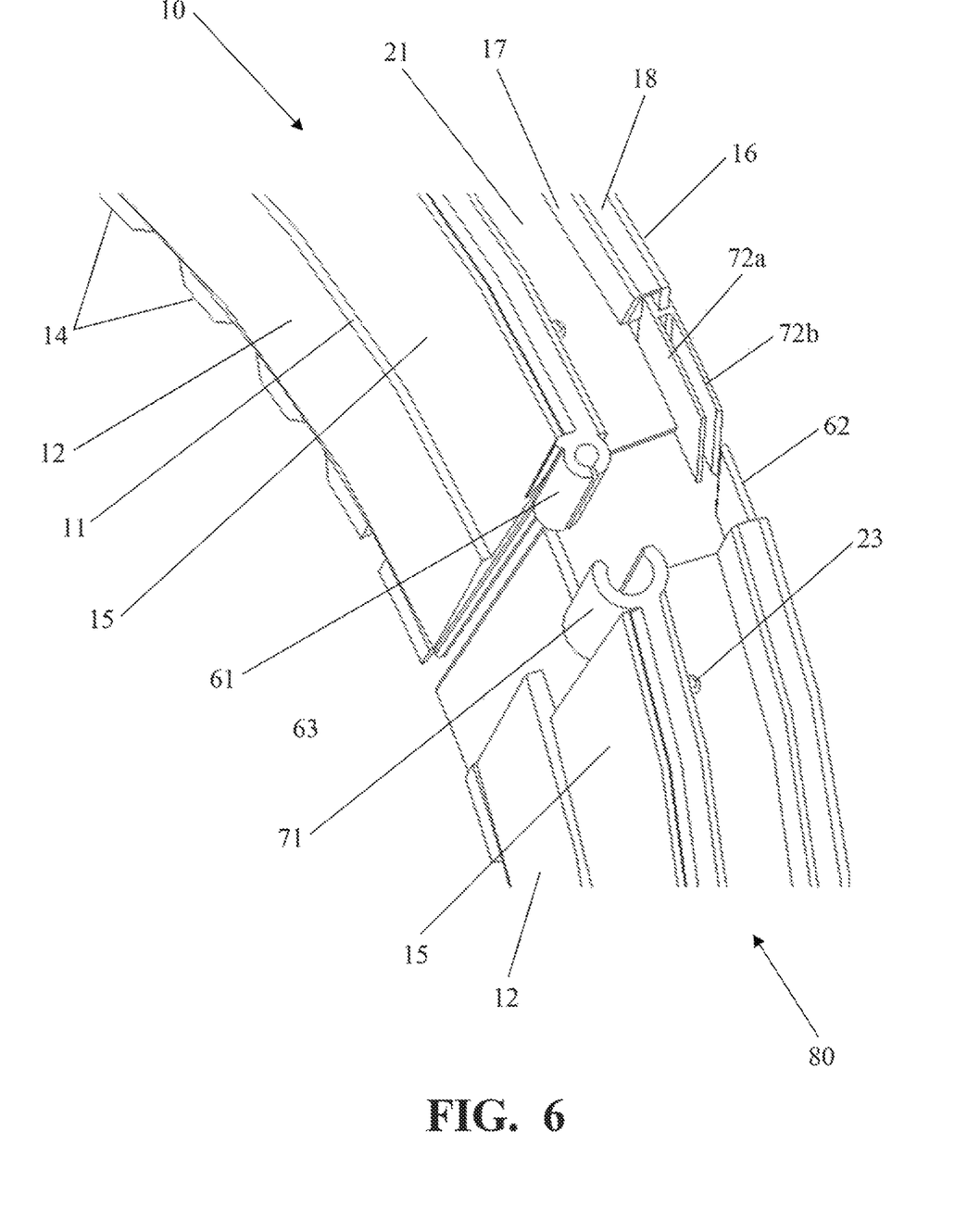
FIG. 6 shows a perspective close up view of the snap joints of the tree watering apparatus according to the present invention.

The attachment of the two semi-circular rings 10 and 80 is accomplished by a male joint 61 and a female joint 71 that snap fit together to form an annular snap joint. The semi-circular rings 10 and 80 have a male joint 61 extending from one end of the inner barrier 15 as shown in FIG. 6 and a female joint 71 extending from the other end. To attach the two semi-circular rings 10 and 80 in a circular configuration, the male joint 61 in the first semi-circular ring 10 is snapped into the female joint 71 of the second semi-circular ring 80. In addition, the male joint in the second semi-circular ring 80 is snapped into the female joint 71 of the first semi-circular ring 80.

Figure 8:
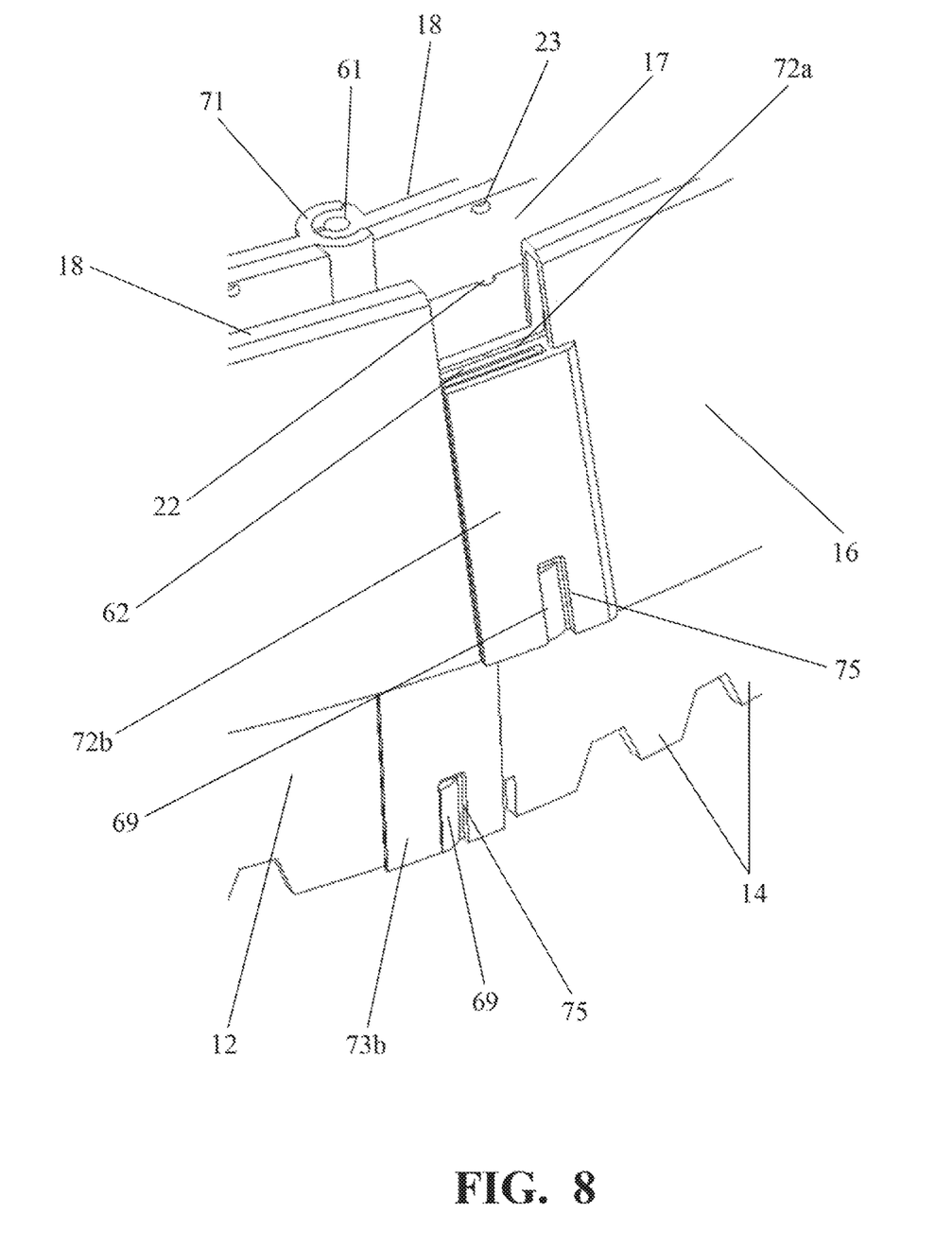
FIG. 8 shows a perspective close up view of the snap joints of the tree watering apparatus according to the present invention in connected configuration and having cantilever snap joints with hooks.

However, once the two semi-circular rings 10 and 80 are attached together into a full circular configuration, water can leak out through the gaps formed at the interface of the two semi-circular rings 10 and 80. Such would compromise the retention of water within the rings 10 and 80 before the water percolates into the ground. Therefore, the tree watering apparatus 100 of the present invention includes a plurality of slats that block such leakage of water. The semi-circular ring 80 has a top inner slat 62 extending from one end of the outer barrier 16 as shown in FIG. 6 and two top outer slats 72a and 72b extending from the other end. When the two semi-circular rings 10 and 80 are attached in a circular configuration, the top inner slat 62 is press fitted in between the two top outer slats 72a and 72b, as shown in FIG. 8, to create a water barrier that prevents leakage of water in between the two rings 10 and 80.

Figure 9:
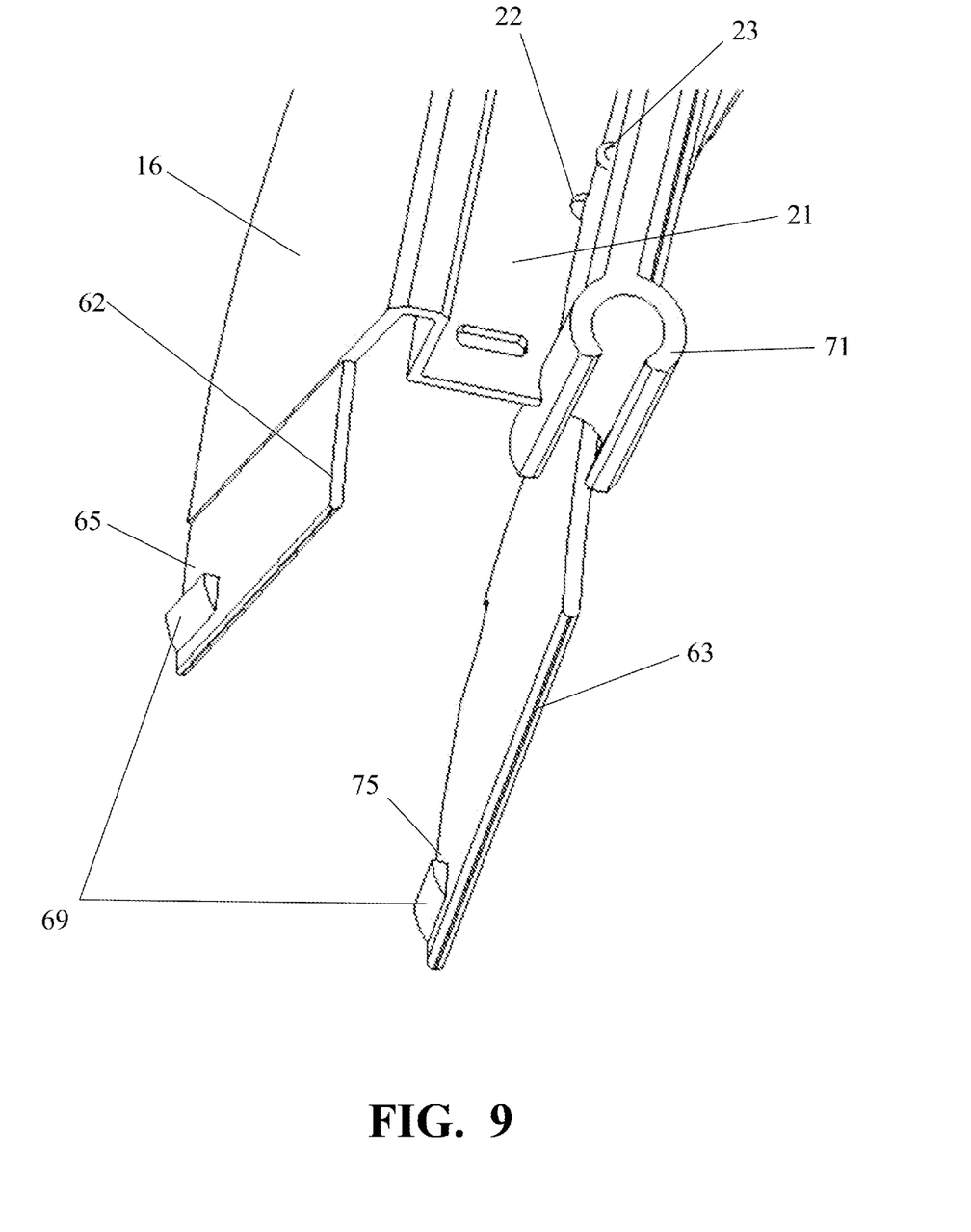
FIG. 9 shows a perspective close up view of the cantilever snap joints.

A similar water barrier is created within the bottom section of the semi-circular ring 10. A bottom inner slat 63 extends from one end of the bottom section as shown in FIG. 9 and two bottom outer slats 73a and 73b extend from the other end. When the two semi-circular rings 10 and 80 are attached in a circular configuration, the bottom inner slat 63 is press fitted in between the two bottom outer slats 73a and 73b, as shown in FIG. 8, to create a water barrier that prevents leakage of water in between the two rings 10 and 80.

In certain circumstances, the need may arise for the two semi-circular rings 10 and 80 to be rigidly attached in a circular configuration. An alternative embodiment of the tree watering apparatus 100 of the present invention accommodates such need by including a top cantilever snap joint 65 in the top inner slat 62 and a bottom cantilever snap joint 75 in the bottom inner slat 63, as shown in FIG. 9. Each of the cantilever snap joints 65 and 75 have a hook 69. When the two semi-circular rings 10 and 80 are attached in a circular configuration and the inner slats 62 and 63 are press fitted within the outer slats 72a, 72b, 73a, and 73b, the hooks 69 snap into a slot 75 in the outer slats, as shown in FIG. 8. Once snapped in place, the hooks 69 cannot be removed, thus, creating a permanent attachment between the two semi-circular rings 10 and 80.

It is understood that the described embodiments of the present invention as discussed above are illustrative only, and that modifications thereof may occur to those skilled in the art. Accordingly, this invention is not to be regarded as limited to the embodiments disclosed, but to be limited only as defined by the appended claims herein.

What is claimed is:

1. A tree watering apparatus comprising:
   a semi-circular ring having a top section, and a bottom section;

a tubing having a first end to which a plug is attached, a second end to which a connector is attached, and a plurality of holes;

wherein said top section comprises an inner barrier, an outer barrier, and a tubing channel therebetween;

wherein said bottom section comprises a bottom barrier;

wherein said tubing is placed in said tubing channel; and wherein said outer barrier comprises a first end from which a top inner slat extends and second end from which two top outer slats extend.

2. A tree watering apparatus comprising:

a semi-circular ring having a top section, and a bottom section;

a tubing having a first end to which a plug is attached, a second end to which a connector is attached, and a plurality of holes;

wherein said top section comprises an inner barrier, an outer bather, and a tubing channel therebetween;

wherein said bottom section comprises a bottom barrier;

wherein said tubing is placed in said tubing channel; and wherein said bottom barrier comprises a first end from which a bottom inner slat extends and a second end from which two bottom outer slats extend.

3. A tree watering apparatus according to claim 2 wherein said top inner slat further comprises a cantilever snap joint having a hook and wherein said top outer slats further comprise a slot.

4. A tree watering apparatus according to claim 3 wherein said bottom inner slat further comprises a cantilever snap joint having a hook and wherein said bottom outer slats further comprise a slot.

5. A tree watering apparatus comprising:

a first semi-circular ring having a top section comprising an inner barrier, an outer barrier, and a tubing channel therebetween; and a bottom section comprising a bottom barrier;

a second semi-circular ring having a top section comprising an inner barrier, an outer barrier, and a tubing channel therebetween; and a bottom section comprising a bottom barrier;

wherein said inner barrier of said first and second semi-circular rings comprises a first end from which a male joint extends and a second end from which a female joint extends;

whereby said first and second semi-circular rings are removably attached together to form a circular configuration by inserting said male joint of said first semi-circular ring into said female joint of said second semi-circular ring and said male joint of said second semi-circular ring into said female joint of said first semi-circular ring;

a tubing placed in said tubing channel of said first and second semi-circular rings and having a plurality of holes;

wherein said outer barrier of said first and second semi-circular rings further comprises a first end from which a top inner slat extends and a second end from which two top outer slats extend; and whereby said top inner slat in said first semi-circular ring is inserted between said two top outer slats in said second semi-circular ring and said top inner slat in said second semi-circular ring is inserted between said two top outer slats in said first semicircular ring.

6. A tree watering apparatus comprising:

a first semi-circular ring having a top section comprising an inner barrier, an outer barrier, and a tubing channel therebetween; and a bottom section comprising a bottom barrier;

a second semi-circular ring having a top section comprising an inner bather, an outer barrier, and a tubing channel therebetween; and a bottom section comprising a bottom barrier;

wherein said inner barrier of said first and second semi-circular rings comprises a first end from which a male joint extends and a second end from which a female joint extends;

whereby said first and second semi-circular rings are removably attached together to form a circular configuration by inserting said male joint of said first semi-circular ring into said female joint of said second semi-circular ring and said male joint of said second semi-circular ring into said female joint of said first semi-circular ring;

a tubing placed in said tubing channel of said first and second semi-circular rings and having a plurality of holes;

wherein said bottom barrier of said first and second Semi-circular rings further comprises a first end from which a bottom inner slat extends and a second end from which two bottom outer slats extend; and whereby said bottom inner slat in said first semi-circular ring is inserted between said two bottom Outer slats in said second semi-circular ring and said bottom inner slat in said second semi-circular ring is inserted between said two bottom outer slats in said first semi-circular ring.

7. A tree watering apparatus according to claim 5 wherein said top inner slat further comprises a cantilever snap joint having a hook that is inserted into a slot in said top outer slats.

8. A tree watering apparatus according to claim 6 wherein said bottom inner slat further comprises a cantilever snap joint having a hook that is inserted into a slot in said bottom outer slats.

* * * * *